G. A. TUTTLE & H. B. THOMPSON.
Car-Coupling.
No. 159,125.
Patented Jan. 26, 1875.
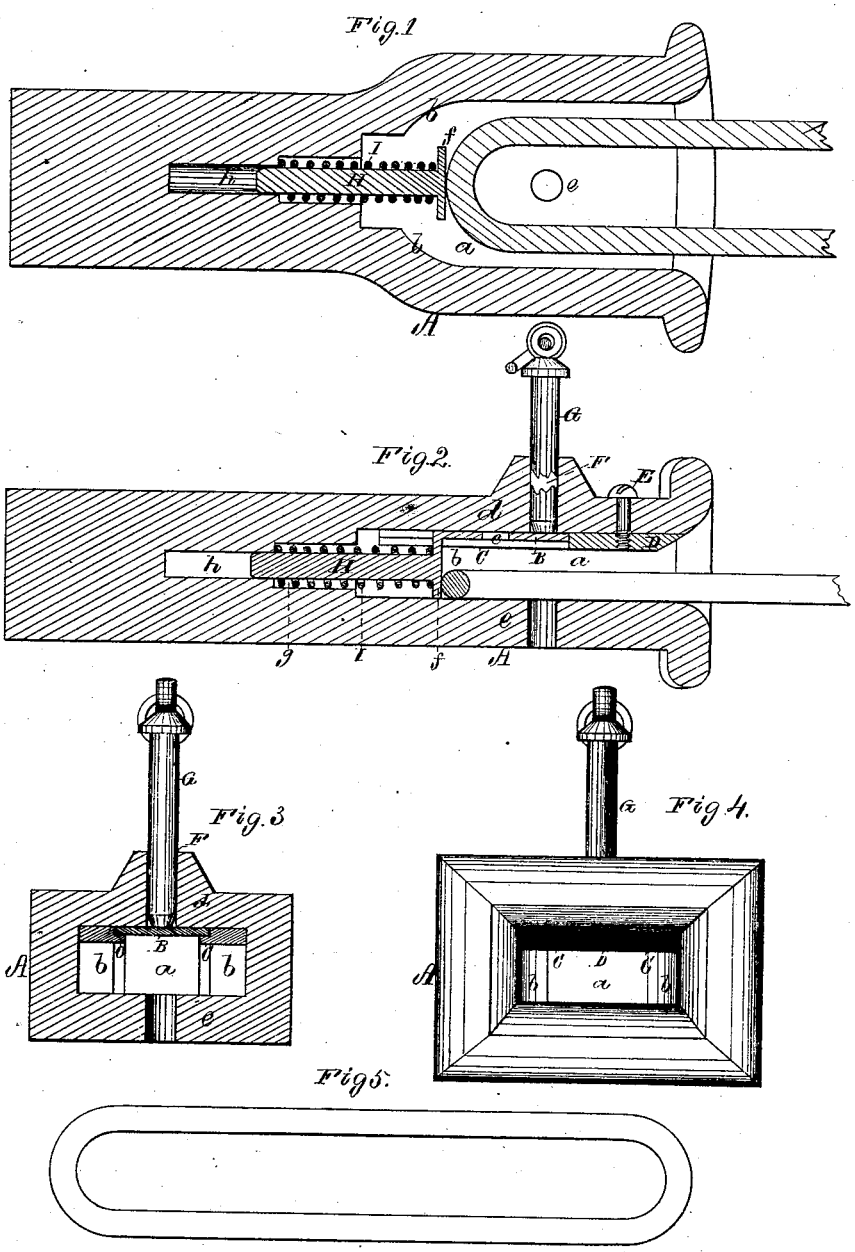

UNITED STATES PATENT OFFICE.

GEORGE A. TUTTLE AND HENRY B. THOMPSON, OF LAWRENCE, MASS.

IMPROVEMENT IN CAR-COUPLINGS.

Specification forming part of Letters Patent No. 159,125, dated January 26, 1875; application filed December 9, 1874.

*To all whom it may concern:*

Be it known that we, GEORGE A. TUTTLE and HENRY B. THOMPSON, of Lawrence, of the county of Essex and State of Massachusetts, have invented a new and useful Improvement in Railway-Carriage Couplings; and do hereby declare the same to be fully described in the following specification and represented in the accompanying drawings, of which—

Figure 1 is a horizontal and longitudinal section; Fig. 2 a vertical and longitudinal section; and Fig. 3 a transverse section, and Fig. 4 a front-end view of a car-coupling having our invention.

Our invention relates to draw-bars provided with a tripper, a movable slide for supporting the link-pin, such slide or tripper being movable by the coupling-link while entering the draw-bar.

In the drawings, A denotes a draw-bar provided with a link-chamber, *a*, as usual, except that at its rear the said chamber is formed with shoulders *b b* for the link to abut against, in order that it may not drive back the slide far enough to break or do injury to its actuating spring. In the upper part of the chamber is a tripper or slide-plate, B, arranged in and between two parallel and rabbeted guides, C C, extending from the mouth of the chamber inward to the shoulders *b b*. In front of the plate and in and between the guides is a plate, D, which is held in place by a screw, E, that goes down through the top part of the draw-bar and screws into the said plate D. The plate D answers as an abutment or stop to arrest the forward motion of the plate B, such plate having a hole, *c*, made through it, and arranged in it, as represented. The purpose of such hole is to enable the plate to be extracted from the draw-bar by means of a hooked rod. There is over the plate, when it is against the stop D, a hole, F, made in the top part, *d*, of the draw-bar. Such hole is to receive the connection-pin G, there being another such hole directly underneath the hole F and through the bottom part, *e*, of said draw-bar. The plate B, at its rear end, is fixed to the head *f* of a spindle, H, around which is a helical spring I. At its front end the spring rests against the head *f*, while at its rear end such spring rests against the rear end of a chamber, *g*, for reception of the spring, such chamber having leading out of its rear end a passage, *h*, for reception of the spindle, as shown. When a coupling-link is driven into the chamber *a* it will come in contact with the head *f* and force it backward and contract the spring, the slide-plate B being moved backward with the said head. On the slide-plate being driven back from underneath the connection-pin, the latter will fall through the link and into the hole F, and by so doing will couple the link and draw-bar. Fig. 5 denotes a top view of the link. The rabbeted guides C C prevent the slide-plate B, and its spindle attached to the head *f*, from being bent downward by the blow or blows of the link, and the movable plate D enables the slide-plate and the bolt and spring to be extracted from or applied to the draw-bar, while the latter is in place on a carriage.

We claim—

In a draw-bar, provided with a slide to support the link-pin, and to be moved from under it by the link, the combination of rabbeted guides C C and the movable stop D, with the draw-bar, and the slide-plate B and its spindle and spring, all as specified.

GEORGE A. TUTTLE.
HENRY B. THOMPSON.

Witnesses:
JAMES MURPHY,
A. V. BUGBEE.